Figure 7:
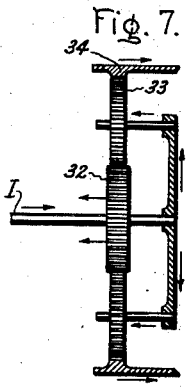

Feb. 14, 1939.  H. FÖTTINGER  2,147,528
TURBOMECHANICAL TRANSMISSION GEAR
Filed Feb. 24, 1936 4 Sheets-Sheet 1
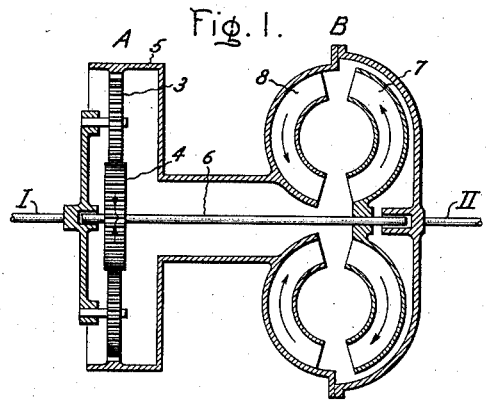
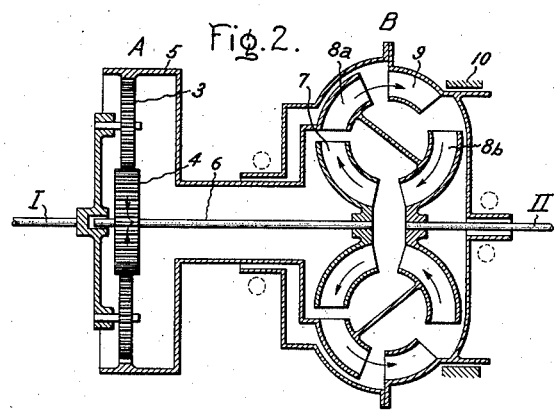
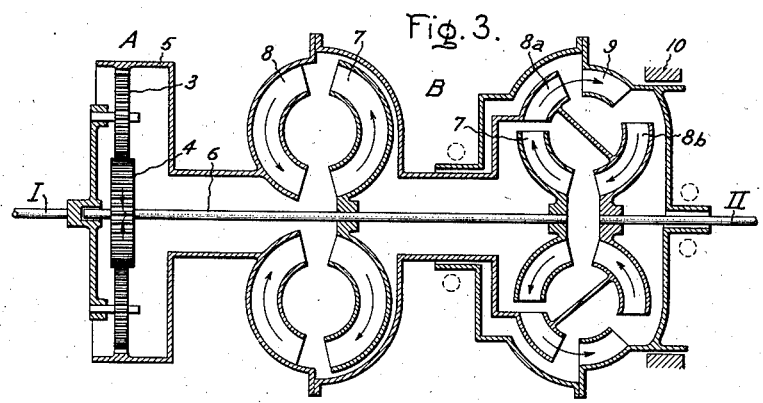
Inventor:
Hermann Föttinger,
by Harry E. Dunham
His Attorney.

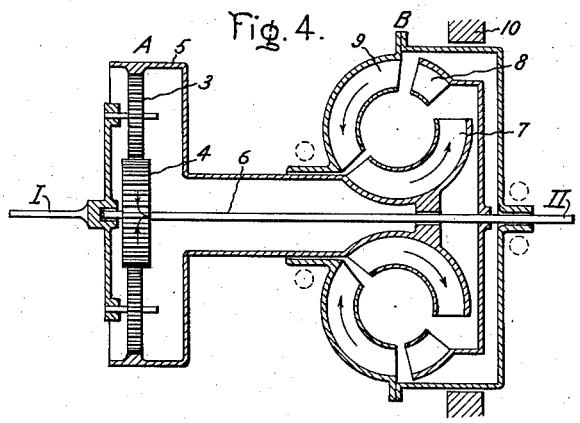
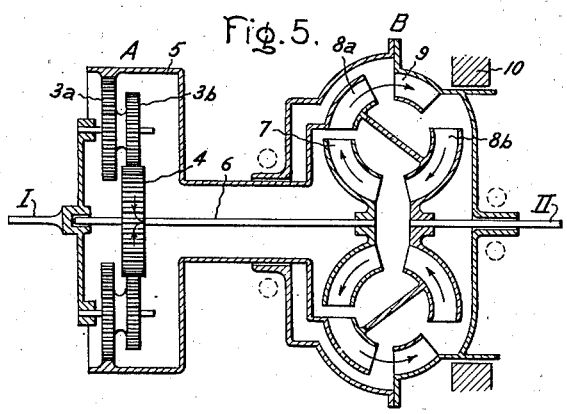
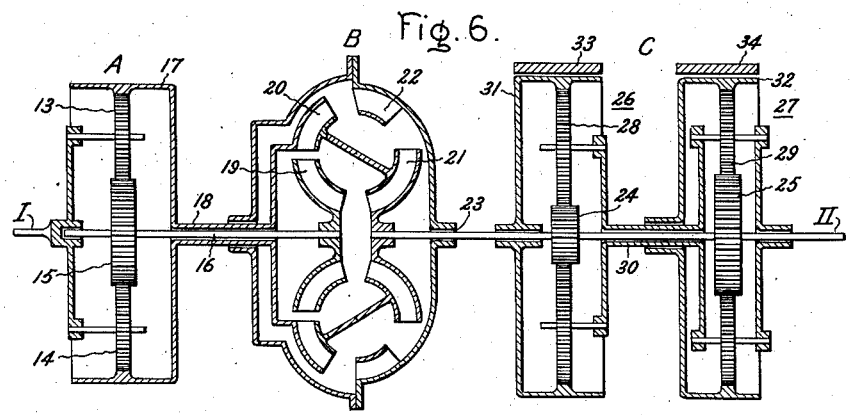

Inventor:
Hermann Föttinger,
by Harry E. Dunham
His Attorney.

Inventor:
Hermann Föttinger,
by Harry E. Dunham
His Attorney.

Patented Feb. 14, 1939

2,147,528

UNITED STATES PATENT OFFICE 2,147,528

TURBOMECHANICAL TRANSMISSION GEAR

Hermann Föttinger, Berlin-Charlottenburg, Germany

Application February 24, 1936, Serial No. 65,305
In Germany March 15, 1935

5 Claims. (Cl. 74—189.5)

This invention relates to turbo-mechanical transmission gear.

According to the invention, the primary part of the turbine portion of such a gear is driven by a mechanical gear which transmits a part of its output, without an intermediate transformation into flow-energy, directly or indirectly to the secondary part or to the secondary shaft of the turbine portion. The turbine portion therefore has to transform only a part of the power into flow-energy so that the transmission losses associated with the intermediate transformation are reduced to a fraction of what they would otherwise be. The turbine portion may consist of one or more torque-converters or couplings. A converter and a coupling may also be employed together and these may be either in separate circuits or in the same circuit.

Previous efforts in the same direction have consisted in combining an electric generator with an electric motor or in combining mechanical and hydrostatic gears but these have been abortive because of the large space that was required by these arrangements and of the weight and corresponding expense. The combined gear according to the invention is without these disadvantages because it is possible to carry the invention into effect with very simple means.

The mechanical drive is effected by means of a differential gear which divides the power and which is connected in front of the primary and secondary part of the turbine portion and preferably consists of an epicyclic gear of well-known construction. The planet wheels are conveniently driven from the input-shaft and the primary and secondary parts of the turbine portion each driven from one of the other wheels of the epicyclic gear. It is, of course, also possible to employ the reverse driving arrangement but in most cases the arrangement suggested will be preferable for constructional reasons.

According to a further feature of the invention, each planet wheel may consist of two wheels with different diameters, of which one is in engagement with the outer wheel and the other with the sun-wheel of the epicyclic gear. In this way greater freedom is obtained as regards the choice of the ratios of the numbers of revolutions so that more satisfactory ratios can be obtained on starting.

The thirteen figures of the accompanying drawings are diagrammatic illustrations of several examples of the various ways in which the invention may be carried into effect.

In the arrangement of Figure 1 the pre-connected mechanical gear in the form of an epicyclic gear is indicated by A and the turbo-gear by B. I is the input-shaft and II the output-shaft of the combined gear. The paths by which the power is transmitted from I to II are indicated by arrows and so is the direction of flow of the working fluid in the turbo-gear. The input-shaft I is connected to the planet-wheels 3 which are in engagement with the sun-wheel 4 and with the outer wheel 5. The sun-wheel 4 is connected to the pump wheel 7 of the turbo-gear by means of the shaft 6, while the outer wheel 5 is coupled with the turbine wheel 8 of the turbo-gear. As will be seen, the turbo-gear is in the form of a coupling working with slip. It will also be seen that the power supplied to the combined gear from the input-shaft I is transmitted to the output-shaft II, on the one hand directly and mechanically, by the planet wheels 3 by way of 5 and 8, and on the other hand indirectly with transformation into flow-energy by way of 4, 6 and 7. The turbo-coupling B therefore has to deal only with a part of the power supplied to the gear, so that the losses associated with the transformation are smaller accordingly.

The latter advantage is of particular importance if the turbo-gear consists of a torque-converter, as is illustrated in Figure 2 of the drawings. As is well-known, a torque-converter is differentiated from a coupling working with slip by reason of the fact that the converter has a stationary guide device. This guide device is formed, in the example illustrated, by the ring of guide blades 9 which can be held stationary by means of the brake 10. If this brake 10 is released, however, the ring of guide blades 9 is allowed to rotate freely as a result of which the torque-converter is transformed, in the well-known manner, into a coupling working with a good deal of slip. Figure 2 also illustrates the application of the invention to an arrangement employing a turbo-gear in which the secondary part 8 is divided into two rings 8a and 8b, which is possible without difficulty.

In the example illustrated in Figure 3 the turbo-gear B consists of two separate circuits of which the left-hand circuit constitutes a coupling working with slip and the right-hand circuit a torque-converter. Here also a part of the power absorbed is again transmitted directly and mechanically to the output-shaft, and the other part indirectly with transformation into flow-energy.

Figure 4 shows the combination of an epicyclic gear with a torque-converter as the turbo-gear. This arrangement differs from the arrangements of Figures 1 to 3 in that here it is not the secondary wheel 8 which is connected with the outer wheel 5 but the primary part 7, while the sun-wheel 4 is coupled with the secondary wheel 8. It will be evident from the drawings that in this case also the division of power which is effected according to the invention can be carried into effect without difficulty.

In the arrangement according to Figure 5 an epicyclic gear A is provided in which the planet wheels are each made up of two wheels 3a and 3b. These two wheels have different diameters and the larger wheel 3a engages with the outer wheel 5 and the smaller wheel 3b with the sun-wheel 4 of the epicyclic gear. The primary and secondary parts of the turbo-gear B, which is connected with the sun-wheel 4, are consequently driven at a lower number of revolutions than in the previous constructions, which is desirable in many cases in view of the characteristic of the turbo-gear.

According to a further feature of the invention, the pre-connected power-dividing mechanical gear drives the pump of the turbo-gear through a step-up transmission and at the same time a step-down transmission gear in the form of an epicyclic change-speed gear is connected to the output of the turbine portion.

The employment of a mechanical step-up transmission gear connected to the input of a mechanical step-down transmission gear connected to the output have in themselves already been proposed. According to this feature of the invention, however, both these transmission gears are employed simultaneously and that connected to the output is an epicyclic-speed gear. As a result of the provision of the pre-connected step-up transmission gear, the pump of the turbo-gear may be driven at a greater number of revolutions than that of the driving motor. As a result, the dimensions of the turbo-gear may be made substantially smaller so that the accommodation of the gear in a limited space, e. g. in a motor vehicle, is facilitated. The epicyclic change-speed gear in combination with the turbine portion, to the output of which it is connected, makes possible the convenient employment of a large number of speeds which offers an additional substantial advantage in the case of motor vehicles.

The drawings illustrate diagrammatically in Figure 6 is an example embodying this last-mentioned feature of the invention. The pre-connected step-up transmission gear is indicated by A, the turbine portion of the gear by B, and the after-connected change-speed gear by C. Furthermore I indicates the input-shaft and II the output-shaft. In the example illustrated the pre-connected transmission gear A consists of a power-dividing epicyclic gear. This gear has a step-up transmission, the planet wheels 13 and 14 being connected with the input-shaft I, the sun-wheel 15 with the pump shaft 16, and the outer wheel 17 with the shaft 18 which leads to the turbine. The turbine portion B is constructed as a torque-increasing torque-converter and has a pump 19, two turbine rings 20 and 21, and a stationary guide device 22. On the shaft 23 leading from the turbine are fixed the sun-wheels 24, 25, of the two epicycle gears 26 and 27 forming parts of the after-connected change-speed gear C. The planet wheels 28 and 29 of the two gears 26 and 27 are connected with one another by a hollow shaft 30 which leads to the output shaft II. 31 and 32 are the two outer rings which can be braked at will by the brakes 33 and 34. According to whether the brake 33 or the brake 34 is applied, the after-connected transmission ratio is different in view of the different dimensions of the sun-wheels 24, 25 on the one hand and the planet wheels 28, 29 on the other hand.

A further feature of the invention consists in effecting the driving of the planet wheels from the input-shaft by means of a connecting member, which returns as regards the flow of power. In this way gear arrangements are made possible which could otherwise only be carried into effect by means of additional gear wheels and turbine rings.

Figures 7–13 of the drawings illustrate various examples of constructions in which this, as well as further features of the invention, are shown.

In all these examples, I again indicates the input-shaft of the gear and II the output-shaft. 30 is the epicyclic gear which is pre-connected as regards the direction in which the power is transmitted, while 31 represents the turbo-gear. The epicyclic gear 30 consists of the sun-wheel 32, the planet wheel 33, and the outer wheel 34. The turbo-gear consists of one or more converters or couplings. The turbo-gear may, as already indicated, also consist of a combination of one or more converters and couplings, converter and coupling being combined either in one circuit or working in separate circuits.

Figure 8:
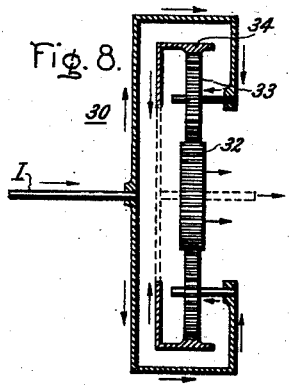

Figures 7 and 8 of the drawings illustrate diagrammatically two different possibilities. In the arrangement of Fig. 7 the input-shaft I passes through the sun-wheel 32 of the epicyclic gear 30. Beyond the inner wheel 32 it branches and effects connection with the carrier of the planet wheels 33 by returning. In the arrangement of Fig. 8 the input-shaft branches before reaching the sun-wheel 32. It then passes round the outer wheel 34 of the epicyclic gear and returns from this point to effect connection with the carrier of the planet wheels 33. The direction in which the power is transmitted is again indicated by arrows in the figures.

Figure 9:
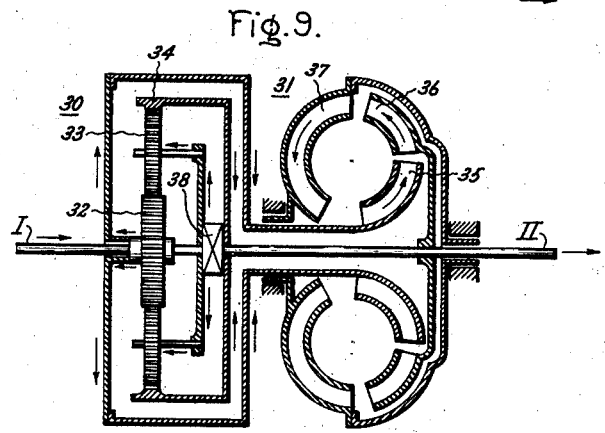

Fig. 9 of the drawings illustrates an example of an arrangement in which the epicyclic gear 30 of Fig. 7 is combined with a converter 31. The input shaft I, as in Fig. 7, returns to effect connection with the planet wheels 33, while the sun-wheel 32 is coupled with the pump wheel 35 of the converter 31. The outer wheel 34 is connected with the output-shaft II on which the turbine-wheel 36 of the converter is also fixed. 37 is the guide wheel of the converter, which is arranged in a fixed casing. 38 is a direct coupling by means of which it is possible directly to couple the input-shaft I and the output-shaft II by bridging over the converter 31.

Figure 10:
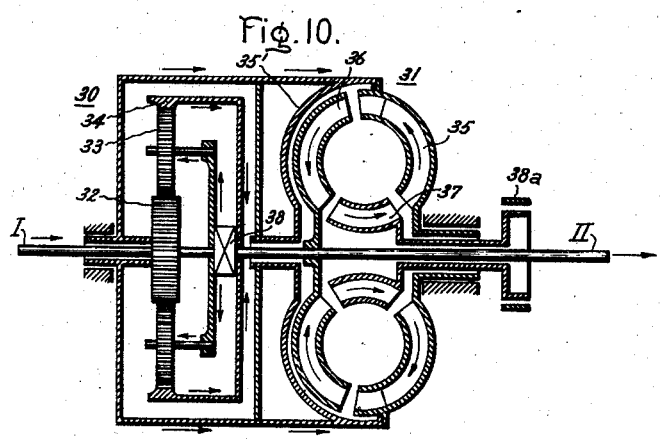
Figure 11:
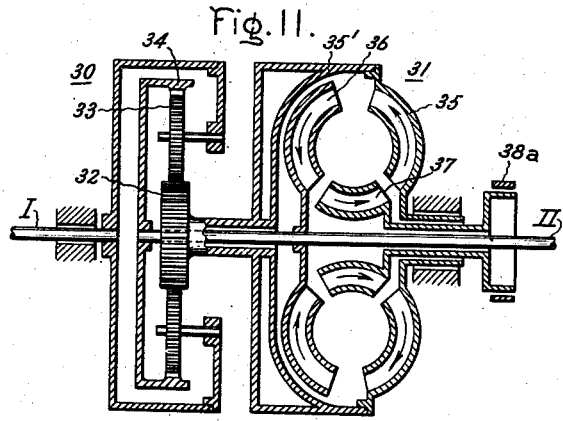

Figs. 10 and 11 of the drawings show the combination of the epicyclic gear with a turbo-gear which unites converter and coupling in one circuit. In the arrangement of Fig. 10 the epicyclic gear is constructed according to Fig. 7, and in the arrangement of Fig. 11 according to Fig. 8. In the two arrangements the carrier of the planet wheels 33 is coupled with the input-shaft I by means of a returning connecting member. The sun-wheel 32 of the epicyclic gear is connected with the rotating pump casing 35' and thus drives the pump wheel 35 of the turbo-gear at greater speed, while the outer wheel 34 is connected with the output shaft II and with the turbine wheel 36. 37 is the guide wheel, which can be held stationary by means of the brake indicated at 38a. If the brake is applied, the turbo-gear operates as a converter, if it is released it operates as a coupling. In the latter case the guide wheel may in addition be connected with the turbine wheel.

Fig. 11 illustrates further features of the invention. Consideration has shown that the invention is of particular importance if the turbine portion consists of a converter in which the reaction effect of the guide-blades can be cut out in well-known manner. Proposals have been made for cutting out the reaction effect. Thus, is is well known to release the guide wheel from the stationary casing and allow it to rotate freely; or to couple it, after its release from the stationary casing, with the turbine wheel by hand or automatically. According to further proposals, emanating from the applicant, the guide wheel is removed from the circuit as a result of axial displacement and is accommodated in a lateral chamber where it may either rotate freely or remain stationary. The cutting out of the reaction effect has the object of depriving the converter of its torque-increasing property and so to convert the converter into a coupling. In the case of a single circuit there is therefore the possibility of travelling either with a torque-increasing converter or with a coupling. However, in spite of this advantage, these turbo-gears have up to now not found application to any substantial extent and this is mainly to be ascribed to the fact that the transmission losses in such gears are relatively high, for with such an arrangement there is obtained neither a complete converter nor a complete coupling. If now, in accordance with a further feature of the invention, and as is indicated in Fig. 11, a power-dividing mechanical gear is connected in front of such a turbo-gear, it is possible to reduce these transmission losses to about one-third. The difficulties which prevented extensive employment of such a turbo-gear are therefore removed by the invention. This feature of the invention may also be employed with equal advantage if the reaction effect of the guide-blades is made ineffective by removing the guide wheel from the circuit as a result of axial displacement as already referred to. It is likewise without great importance whether the pre-connected power-dividing transmission gear is arranged in the manner indicated in Fig. 1 or in some other manner.

Figure 12:
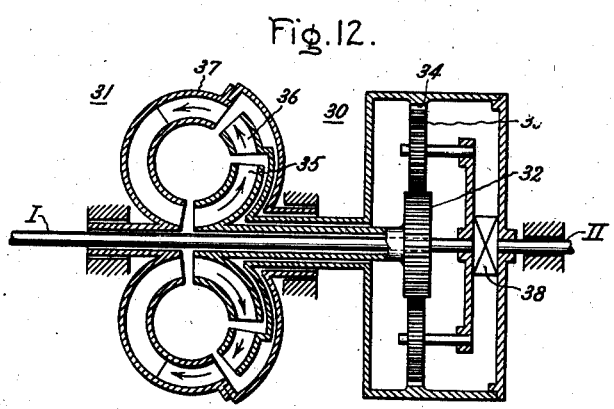

The arrangement according to Fig. 12 is different from those previously described in that the turbo-gear 31 is arranged, as regards its position, on the driving side, that is seen from the motor, in front of the epicyclic gear 30, which is pre-connected as regards the direction in which the power is transmitted. The input-shaft I is for this purpose carried through the turbo-gear 31 and only connected by returning with the carrier of the planet wheels 33 after its passage through the gear 31. The turbo-gear is assumed to be a simple converter with only three wheels 35, 36, 37, the pump wheel 35 being again driven from the sun-wheel 32 of the epicyclic gear at a higher speed, while the turbine wheel 36 is connected with the outer wheel 34 and with the output-shaft II, and the guide wheel 37 is arranged in the stationary casing.

Figure 13:
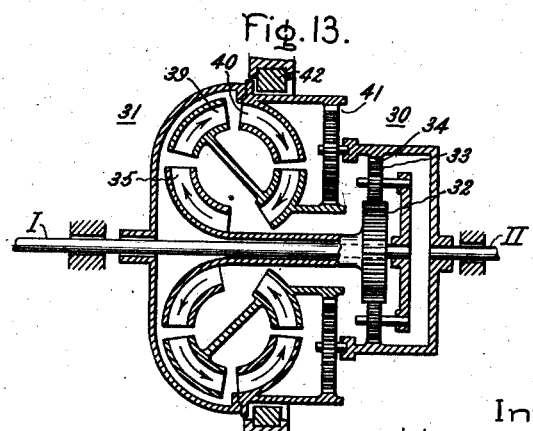

From Fig. 13 it may be seen that the invention is applicable also to a combination in which the turbo-gear is of relatively complicated construction. The turbo-gear 31 is situated, as in the arrangement of Fig. 12, in front of the epicyclic gear 30. The turbo-gear consists of the four wheels 35, 39 and 40. 35 is the pump wheel. 39 and 40 are turbine wheels, which are connected together by means of a special epicyclic gear 41. At 42 is indicated a toothed locking ring forming part of a free wheeling clutch, which prevents backward running of the wheel 40.

I claim:

1. A turbo-mechanical gear arrangement including the combination of a hydraulic turbo-type gear having a primary and a secondary element forming parts of a fluid circuit, an epicyclic spur type gearing including a sun gear, a plurality of planet gears meshing with the sun gear, a carrier for the planet gears and an outer gear meshing with the planet gears, means mechanically connecting one of the gears of the gearing with the primary element, means mechanically connecting another gear of the gearing with the secondary element to transmit torque between the secondary element of the hydraulic gear and the gearing without transforming it into flow energy in the hydraulic gear, and means for driving the gearing including a returning connecting member which is formed at least partly by the carrier and which returns as regards the direction of transmission of power.

2. A turbo-mechanical gear arrangement including the combination of a hydraulic turbo-type gear having a primary and a secondary element forming parts of a fluid circuit, an epicyclic spur type gearing including a sun gear, a plurality of planet gears meshing with the sun gear, a carrier for the planet gears and an outer gear meshing with the planet gears, means mechanically connecting one of the gears of the gearing with the primary element, means mechanically connecting another gear of the gearing with the secondary element of the hydraulic gear to transmit torque between the secondary element of the hydraulic gear and a driven shaft without transforming it into flow energy in the hydraulic gear, and a drive shaft for the gearing arranged to pass centrally through the sun gear and secured to said carrier intermediate the gearing and the hydraulic gear.

3. A turbo-mechanical gear arrangement including the combination of a hydraulic turbo-type gear having a primary and a secondary element forming parts of a fluid circuit, an epicyclic spur type gearing including a sun gear, a plurality of planet gears meshing with the sun gear, a carrier for the planet gears and an outer gear meshing with the planet gears, an input shaft, the carrier for the planet gears having U-shaped portions, one leg of each U being connected to a planet on one side thereof and the other leg of each U being connected to the input shaft on the opposite side of the planet, means mechanically connecting one of the gears of the gearing with the primary element of the hydraulic gear, and means mechanically connecting another gear of the gearing with the secondary element of the hydraulic gear to transmit the input torque at least partly to the secondary element of the hydraulic gear without transforming it into flow energy in the hydraulic gear.

4. A turbo-mechanical gear arrangement including the combination of a hydraulic turbo-type gear having a primary element forming a rotatable pump casing and a secondary element forming parts of a fluid circuit, an epicyclic spur type gearing including a sun gear, a plurality of planet gears meshing with the sun gear, a carrier for the planet gears and an outer gear meshing with the planet gears, means mechanically connecting the sun gear of the gearing with the primary element of the hydraulic gearing, means mechanically connecting another gear of the gearing with the secondary element of the hydraulic gear to transmit torque between the gearing and the secondary element of the hydraulic gear without transforming it into flow energy in the hydraulic gear, and means for driving the gearing, said means including a connecting member which is formed at least partly by the carrier and which returns as regards the direction of transmission of power.

5. A turbo-mechanical gear arrangement including the combination of a hydraulic turbo-type gear having a primary and a secondary element forming parts of a fluid circuit, an epicyclic spur type gearing including a sun gear, a plurality of planet gears having shafts and meshing with the sun gear, a carrier for the shafts of the planet gears and an outer gear meshing with the planet gears, means mechanically connecting one of the gears of the gearing with the primary element, means mechanically connecting another gear of the gearing with the secondary element of the hydraulic gear to transmit torque between the secondary elemnt of the hydraulic gear and a driven shaft without transforming it into flow energy in the hydraulic gear, and a drive shaft for the gearing fastened to the carrier and arranged parallel to the planet shafts to effect direction of power flow through the planet shafts in a direction opposite to the direction of power flow through the drive shaft.

HERMANN FÖTTINGER.